United States Patent [19]
Stemper

[11] Patent Number: 4,634,385
[45] Date of Patent: Jan. 6, 1987

[54] TEACHING WHEELS

[76] Inventor: Virginia Stemper, Rte. 3, Plymouth, Wis. 53073

[21] Appl. No.: 809,305

[22] Filed: Dec. 16, 1985

[51] Int. Cl.[4] .............. G09B 1/22; G09B 19/02; G09B 19/12
[52] U.S. Cl. .................. 434/198; 434/205; 434/207; 434/304; 434/348; 434/404
[58] Field of Search .............. 434/198, 404, 348, 206, 434/205, 207, 170, 174, 304

[56] References Cited

U.S. PATENT DOCUMENTS

| | | | |
|---|---|---|---|
| 1,346,929 | 7/1920 | Zion | 434/348 |
| 1,662,503 | 3/1928 | Krieger | 434/198 |
| 1,728,584 | 9/1929 | Wright | 434/198 |
| 3,011,270 | 12/1961 | Hosbach | 434/198 |
| 3,136,074 | 6/1964 | Hawkins | 434/198 X |
| 3,249,085 | 5/1966 | St. Jean | 434/404 X |
| 3,289,324 | 12/1966 | Benson | 434/198 |
| 4,021,940 | 5/1977 | Saint | 434/198 X |
| 4,313,727 | 2/1982 | Hults | 434/198 X |
| 4,389,193 | 6/1983 | Phillips | 434/404 X |
| 4,487,418 | 12/1984 | Allen, Sr. | 434/404 X |

FOREIGN PATENT DOCUMENTS

| | | | |
|---|---|---|---|
| 861369 | 10/1940 | France | 434/198 |
| 161237 | 3/1921 | United Kingdom | 434/198 |
| 180102 | 5/1922 | United Kingdom | 434/198 |

Primary Examiner—William H. Grieb
Attorney, Agent, or Firm—Donald Cayen

[57] ABSTRACT

A teaching wheel challenges a student to find the correct answer to arithmetic and other problems. The teaching wheel comprises a problem disk and an answer disk mounted concentrically for rotation on a frame. The problem disk is mounted above the frame, and the answer disk is mounted under the frame. The problem disk has a smaller diameter than the answer disk and frame. The problem disk is divided into a number of sectors, with a problem radiating outwardly in each sector. The answer disk has sectors containing the answers to the problems near the periphery of the disk. The frame is notched to reveal one answer on the answer disk. The problem disk is rotated so a selected problem sector is aligned with the frame notch, and the answer disk is rotated until the correct answer appears in the notch adjacent the problem sector. The problems may consist of counting, arithmetic equations, time equivalents, and money equivalents.

19 Claims, 8 Drawing Figures

- ⊙ PENNY
- ⊛ NICKEL
- ● DIME
- ⊗ QUARTER
- ◎ HALF DOLLAR
- [$] DOLLAR

TEACHING WHEELS

BACKGROUND OF THE INVENTION

1. Field of the Invention

This invention pertains to education, and more particularly to educational apparatus that helps children learn arithmetic related concepts.

2. Description of the Prior Art

Various equipment has been developed to aid young children learn elementary concepts of numbers, counting, and arithmetic. An example of educational aids are the familiar flash cards. Cards bearing problems to be solved are displayed by a teacher or parent. The student gives her answer to the person displaying the cards, who affirms or corrects the answer. While flash cards have been widely used, they nevertheless have the disadvantage of normally requiring a second person to be present to display the cards to the student. Further, learning by flash cards is dull and unimaginative, and consequently their use is made more pleasant if the student does not have to use them by herself to learn the desired concepts.

Educational aids do exist that can be used alone by a student. However, the existing teaching aids are handicapped by certain other disadvantages that prevent them from being entirely successful or readily acceptable by children and their teachers. The major disadvantage of most of the prior teaching aids is that they present no challenge to the student because the answers are automatically given along with the corresponding problem. For example, in U.S. Pat. Nos. 1,728,584 and 3,289,324; British Pat. No. 161,237; and French Pat. No. 861,369 the components of the respective devices are arranged such that both the problems and the corresponding answers are displayed simultaneously. Therefore, the student need not exercise any thinking ability to obtain the correct answers to the problems.

The educational toy of U.S. Pat. No. 3,011,270 does not include any problem at all. Rather, the toy merely relates a particular numeral to its written form and to the corresponding number of objects.

Another deficiency of the prior teaching devices is that the problems and answers are not arranged in the normal and continuous manner of an arithmetic equation, e.g., a horizontal equation as "2+3=5". In the device of U.S. Pat. No. 3,136,074, for example, the answers to the vertically arranged problems are not vertically under the problems, but are separated from the problem. In other devices, such as in U.S. Pat. No. 1,662,503, the functions to be performed are either omitted or are presented in multiple and hence confusing form.

Thus, a need exists for a teaching aid that presents a proper and accurate arithmetic equation and that challenges the student to think and choose the correct answer.

SUMMARY OF THE INVENTION

In accordance with the present invention, teaching wheels are provided that enable and encourage a child to develop mathematical skills in an interesting and easy to use manner. This is accomplished by apparatus that includes a pair of concentric disks that are relatively rotatable to present to the child a multiplicity of problems and possible answers to each problem.

The disks are mounted for rotation to a generally circular frame. To aid the child in holding the teaching wheel, the frame is fabricated with a handle protruding therefrom. One disk, the problem disk, is placed on top of the frame. The problem disk bears indicia that corresponds to several simple problems. For example, the problems may be in the form of partial arithmetic equations, e.g., "2+3=". The problem disk is divided into sectors, with a problem printed in each sector. The problems radiate from the center of the disk, with the "=" sign placed close to the periphery of the disk. The problem disk has an outer diameter that is less than the outer diameter of the frame.

The second disk, the answer disk, is mounted under the frame. The answer disk has a diameter approximately equal to the diameter of the frame. The answer disk bears indicia corresponding to the answers to the various problems contained on the problem disk. If the problem is an arithmetic equation, the answer indicia comprise numerals that satisfy each of the equations, such as "5". The answer indicia are arranged in sectors of the same included angle as the problem disk sectors. The answer indicia radiate from the center of the answer disk and are placed close to the periphery of the answer disk, such that the answer indicia lie radially outwardly from the problem. With an aritmetic problem of the type "2+3=", the answer is in line with the "=" sign indicia on the problem disk.

To enable the answer indicia on the bottom disk to be visible, the frame is formed with a partial sector shaped notch extending from the periphery of the frame inwardly to a location approximately coinciding with the periphery of the problem disk. Thus, all the problems contained on the problem disk are always visible to the child, but only one answer indicia on the answer disk is visible in the frame notch.

To use the teaching wheel of the present invention, the child selects any of the problems and rotates the problem disk until the sector containing the chosen problem is aligned with the partial sector notch in the frame. The student then performs the second and challenging step of thinking of the correct answer. With the chosen answer fixed in her mind, she rotates the answer disk until the correct answer appears in the frame notch. To aid in determining the correctness of the answer, each problem and corresponding answer preferably are coded, as by a common symbol or color, and no two problems and corresponding answers have the same code.

In a modified embodiment of the present invention, the problem indicia of the arithmetic equations are replaced by simple counting problem indicia suitable for very young children. The counting problem indicia include a numeral and a symbol within each problem disk sector. Indicia bearing quantities of symbols corresponding to each problem numeral and symbol are contained on the answer disk sectors. In use, the child first selects a numeral and symbol on the problem disk and rotates the problem disk until the chosen problem sector is aligned with the frame partial sector notch. She then must perform the challenging step of attempting to visualize the quantity of symbols corresponding to the numeral. The child rotates the answer disk until the symbol that corresponds with the symbol on the chosen problem sector appears in the frame notch. Viewing the symbols in the notch encourages the child to point to them with her finger and count them. She thus learns to correlate the quantity of objects associated with the selected numeral.

Additional embodiments of the present invention may utilize indicia for teaching a child the concepts of money, time, and music.

Other aims and advantages of the invention will become apparent to those skilled in the art from reading the detailed description of the invention.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
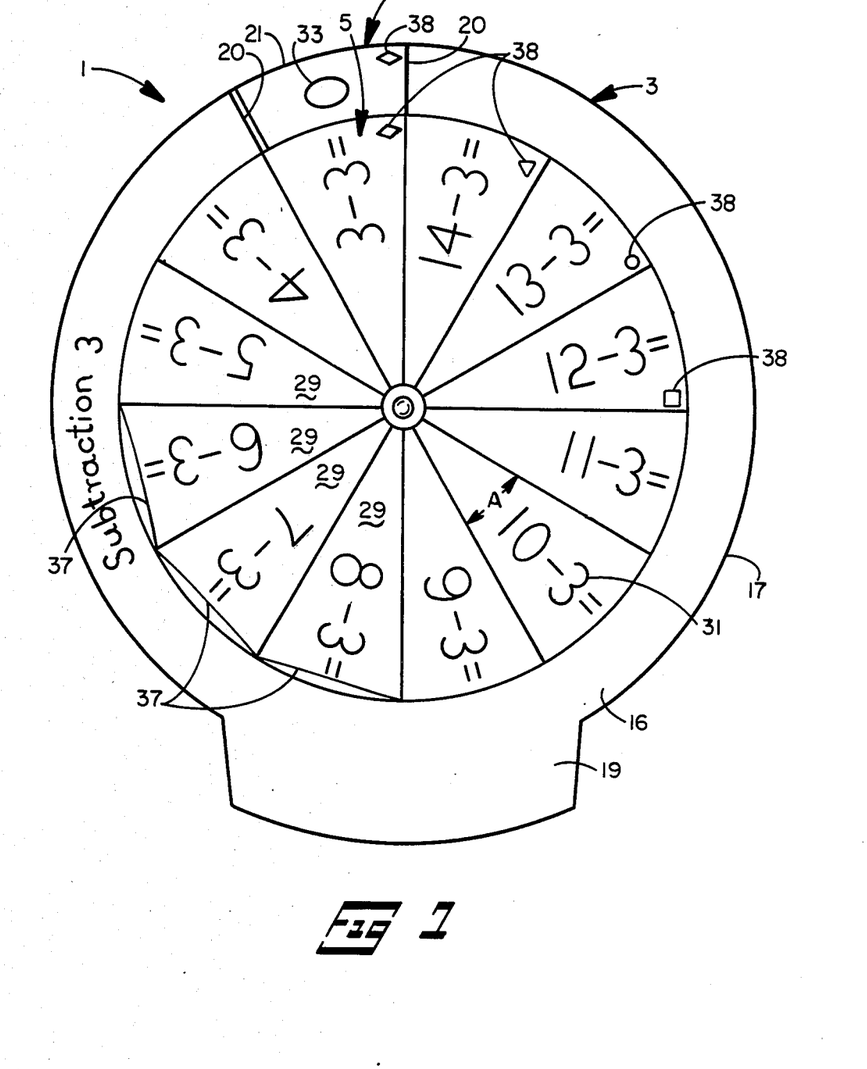
FIG. 1 is a top view of the teaching wheel of the present invention.
Figure 2:
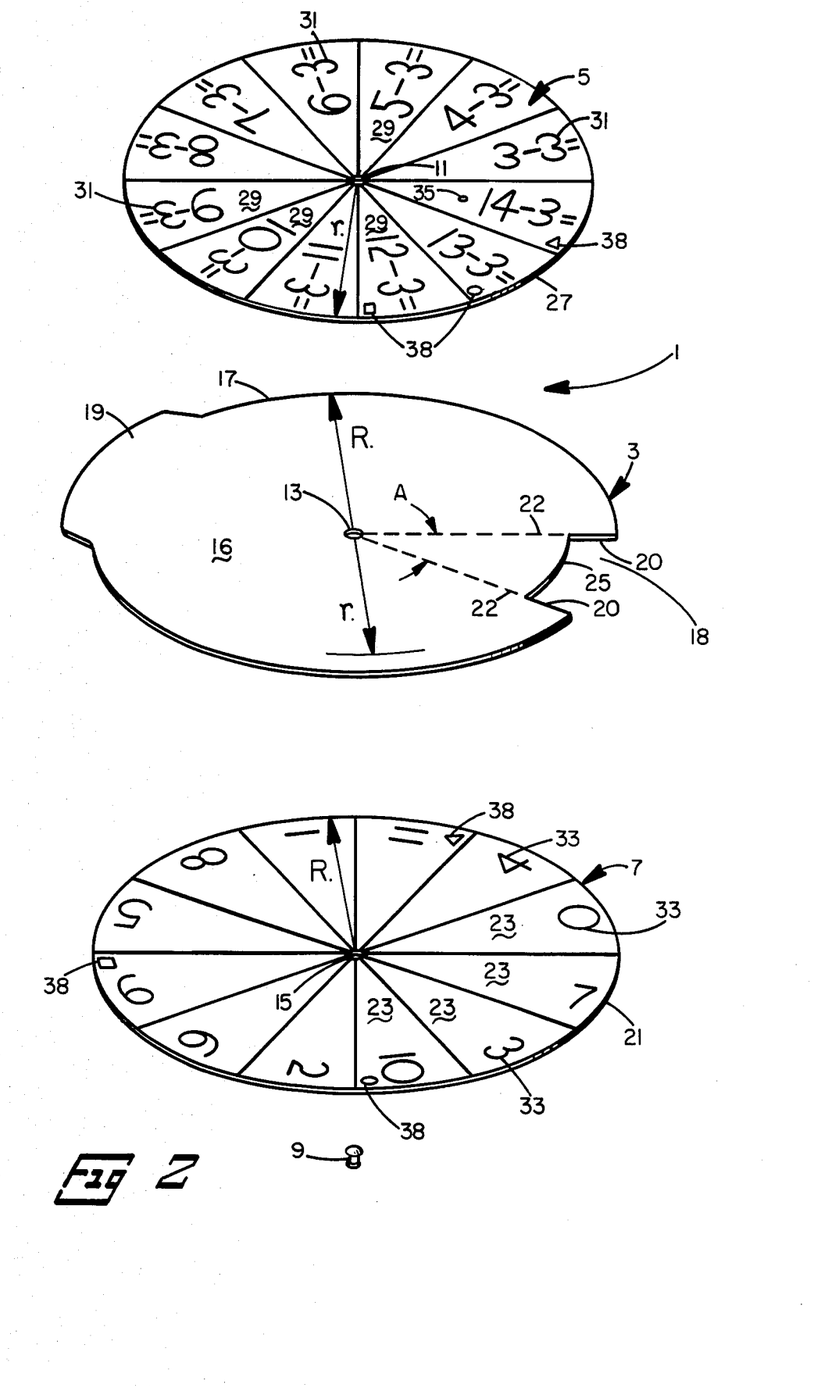
FIG. 2 is an exploded perspective view of the teaching wheel of FIG. 1.

Referring to FIGS. 1 and 2, a teaching wheel 1 is illustrated that includes the present invention. The teaching wheel is particularly useful for teaching arithmetic concepts to young students, but it will be understood that the invention is not limited to elementary educational applications.

The teaching wheel 1 comprises a frame 3, a problem disk 5, and an answer disk 7. The problem disk 5 and answer disk 7 are mounted concentrically on the frame 3 for rotation relative thereto by a rivet 9 or other suitable fastener passing through holes 11, 13, and 15 in the problem disk, frame, and answer disk, respectively.

The frame 3 is constructed with a main section 16 that preferably has a circular periphery 17 of radius R. To assist the child to hold the teaching wheel 1, the frame includes a handle 19 extending from the frame periphery 17.

The frame 3 is formed with a notch 18 in the periphery 17 that is bounded by a pair of edges 20. The edges 20 are extensions of radial lines 22 extending from the center of rotation 13 of the problem disk 5 and answer disk 7. The radial lines 22 subtend an included angle A. The notch 18 is further defined by an edge 25 that lies closer to the center 13 than a second radius r.

The frame 3 may be made of heavy cardboard or plastic. Preferably, the frame material is attractive and colorful.

The problem disk 5 may be made of thin construction board or similar suitable material. The material may be erasable, as will be explained hereinafter. The problem disk has a radius r. Thus, when the problem disk is mounted to the frame by the rivet 9 through holes 11 and 13, the periphery 27 of the problem disk overlays the frame notch edge 25. The problem disk is divided into a number of sectors 29. In FIGS. 1 and 2, 12 sectors are shown, but it will be understood that fewer or more sectors may be employed. Preferably, the included angle of the sectors 29 is the same as the included angle A of the lines 22 and edges 20 of the frame 3.

The teaching wheel 1 of FIGS. 1 and 2 is in the form of a number wheel that is designed to teach arithmetic concepts. Extending radially in a row within each sector 29 on the problem disk 5 is a portion 31 of a horizontally written arithmetic equation. As illustrated, the partial equations 31 are arranged such that they constitute accurately expressed problems to be solved by the student using the number wheel. The problem equations are further arranged such that the "=" signs of the equations lie adjacent the disk periphery 27. Alternately, the problems may radiate in columns that accurately express problems in vertical form.

Any arithmetic problems may be utilized. However, I have found that the teaching wheel 1 best accomplishes its intended purpose if only one type of problem is associated with each teaching wheel. Thus, in FIGS. 1 and 2, only subtraction problems are used with the illustrated teaching wheel. It is recommended that separate teaching wheels be employed for addition, multiplication, and division problems. Further, I have found that children best master the various arithmetic functions if a number wheel performs the designated function on just one number. For example, the number wheel of FIGS. 1 and 2 subtracts only the numeral 3 in each of the sectors.

The answer disk 7 may be made of the same material as the problem disk 5. The radius of the answer disk is preferably equal to or a little greater than the radius R of the circular periphery of the frame 3. Thus, when the answer disk is assembled to the frame by means of the rivet 9, the periphery 21 of the answer disk coincides with or slightly underlies the periphery 17 of the frame.

The answer disk 7 is divided into a number of sectors 23 equal to the number of sectors in the problem disk 5. Thus, the included angle of the sectors 23 is the same as the included angle of the problem disk sectors 29. Near the periphery 21 of each sector 23 is a numeral 33 that corresponds to the answer of one of the partial equations 31 on the problem disk.

To aid the child learn the correct answers to the various problems, the partial equations 31 and the respective correct answers 33 preferably are coded. For example, the partial equations on the problem disk 5 may be printed in various colors, and the respective correct answer numerals of the answer disk 7 would be printed in the corresponding respective colors. I have found that color coding the problem disk has the further benefit of making the teaching wheels very attractive, particularly when the frame 3 is of a colorful material, thus encouraging children to use the teaching wheels. Coding may also be accomplished by placing a different small symbol, shown typically by reference numeral 38, in each problem sector and placing the same symbol in the respective correct answer sectors 23.

To use the teaching wheel 1 of the present invention, the student holds the handle 19 of the frame 3 in one hand. She selects a partial equation 31 on the problem disk 5 that represents a problem to be solved. She then rotates the problem disk with her second hand until the sector 29 bearing the partial equation is aligned with the notch 18 in the frame. The student mentally chooses the correct answer. To check the accuracy of the chosen answer, she finally rotates the answer disk 7 with her second hand until the correct answer 33 to the selected problem appears in the notch. Correctness of the answer is indicated by the correlation of the code indicia of the selected problem sector and the answer sector. The child then mentally compares her chosen answer with the correct answer, and thus mentally corrects an incorrect answer or reinforces a correct answer. With the correct answer in the notch, a complete and accurately expressed arithmetic equation is presented to the child. I have found that children not only obtain great enjoyment from twirling the problem and answer disks, but also that they enjoy the satisfaction of choosing the correct answers to the various selected problems.

The notch 18 and handle 19 of FIGS. 1 and 2 are shown approximately 180° apart on the frame 3. That is a satisfactory construction for partial equations 31 that extend in rows from the center 11 to form horizontal equations as shown in FIGS. 1 and 2. If the problems in the problem disk sectors 29 radiate in columns from the center 11 to form vertically written problems, the handle and notch are placed at about 90° to each other.

To assist in rotating the problem disk 5, one or more holes 35 may be punched through the disk. The hole can be large enough to receive a fingertip, or smaller for receiving a pencil or other small diameter object. Alternately, rotating the problem disk and/or the answer disk may be made easier for the student by scalloping the peripheries of the disks. For example, in FIG. 1, the problem disk is shown with typical concave scallops 37 in the periphery 27. It will be understood, of course, that the scallops 37 would extend completely around the disk peripheries.

The peripheries of the problem disk 5 and answer disk 7 are not limited to circular contours. The disks may have flat sides at the outer end of each sector; thus, the disks may be of polygon configuration. The frame 3, too, may have flat sides corresponding to the disk polygons.

Figure 3:
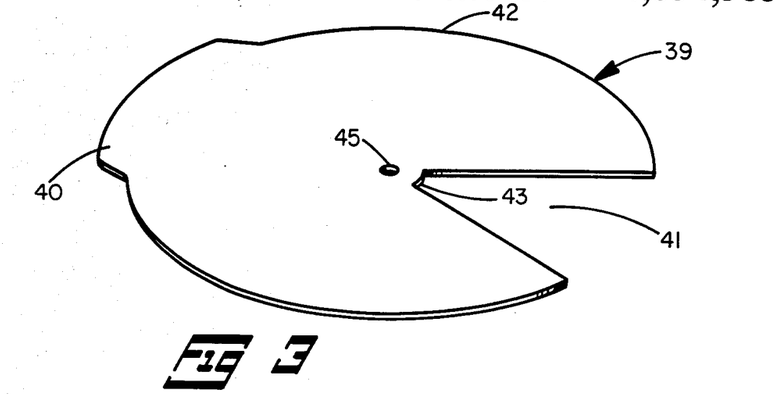
FIG. 3 is a perspective view of an optional cover for the teaching wheel of the present invention.

If desired, the teaching wheel 1 of FIGS. 2 and 3 can be modified so that only one problem at a time is visible to the student. That is accomplished by adding a cover member 39, as shown in FIG. 3, on top of the problem disk 5. The cover 39 is similar in most respects to the frame 3, FIGS. 1 and 2, having a handle 40 and a circular periphery 42. The major difference between the cover 39 and the frame is that the cover is formed with a long sector shaped cutout 41 rather than the relatively short notch 18. The included angle of the cutout 41 is equal to the included angle of the sectors 29 of the problem disk. The cutout terminates at inner edge 43 located a short distance from the cover center hole 45. When the cover is fastened to the frame, problem disk, and answer disk by the rivet 9, only one partial equation 31 on the problem disk is viewable at a time through the cutout. To provide an easy to grasp unitary package, the handles 19 and 40 may be joined by any suitable means. If desired, the cover may be of a smaller size than the frame. Specifically, the cover periphery 42 may have a radius equal to or slightly less than radius r of the problem disk. In that case, the frame periphery 17 lies outside the cover periphery 42 when the cover, frame, and disks are assembled. The smaller cover periphery is especially desirable for enabling young children to easily spin the problem disk, since the problem disk periphery is then easily touched and rotated.

Figure 4:
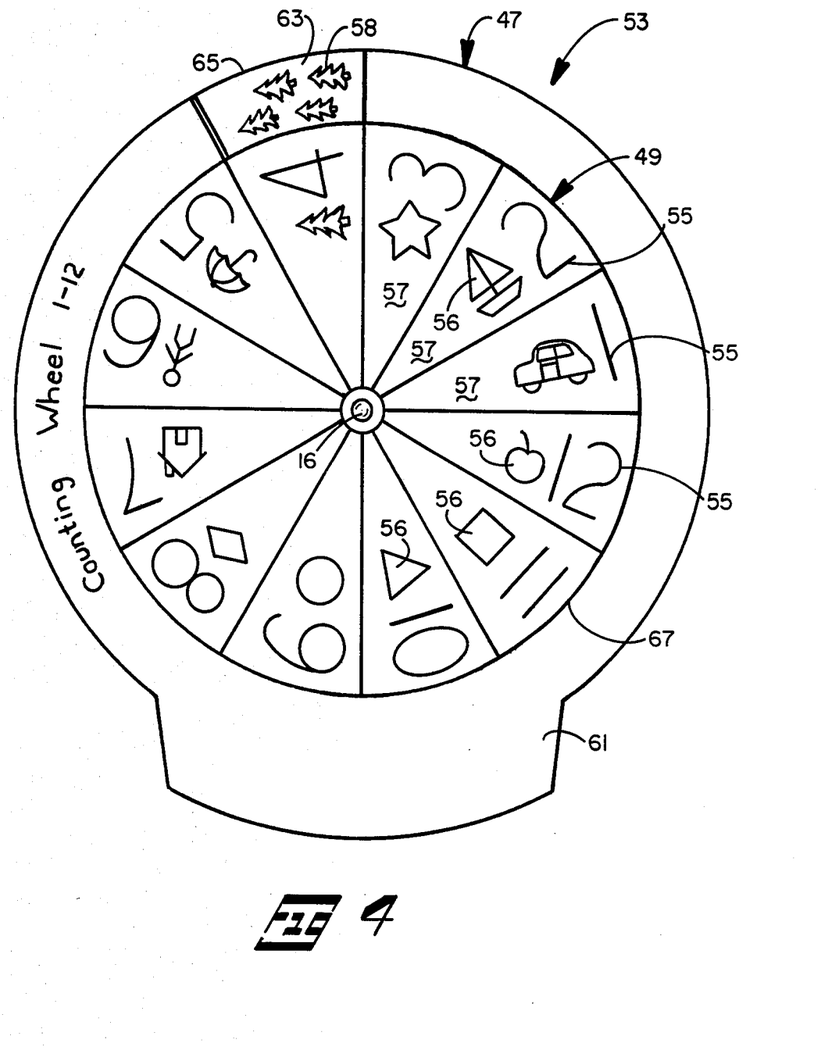
FIG. 4 is a top view of a modified embodiment of the present invention.
Figure 5:
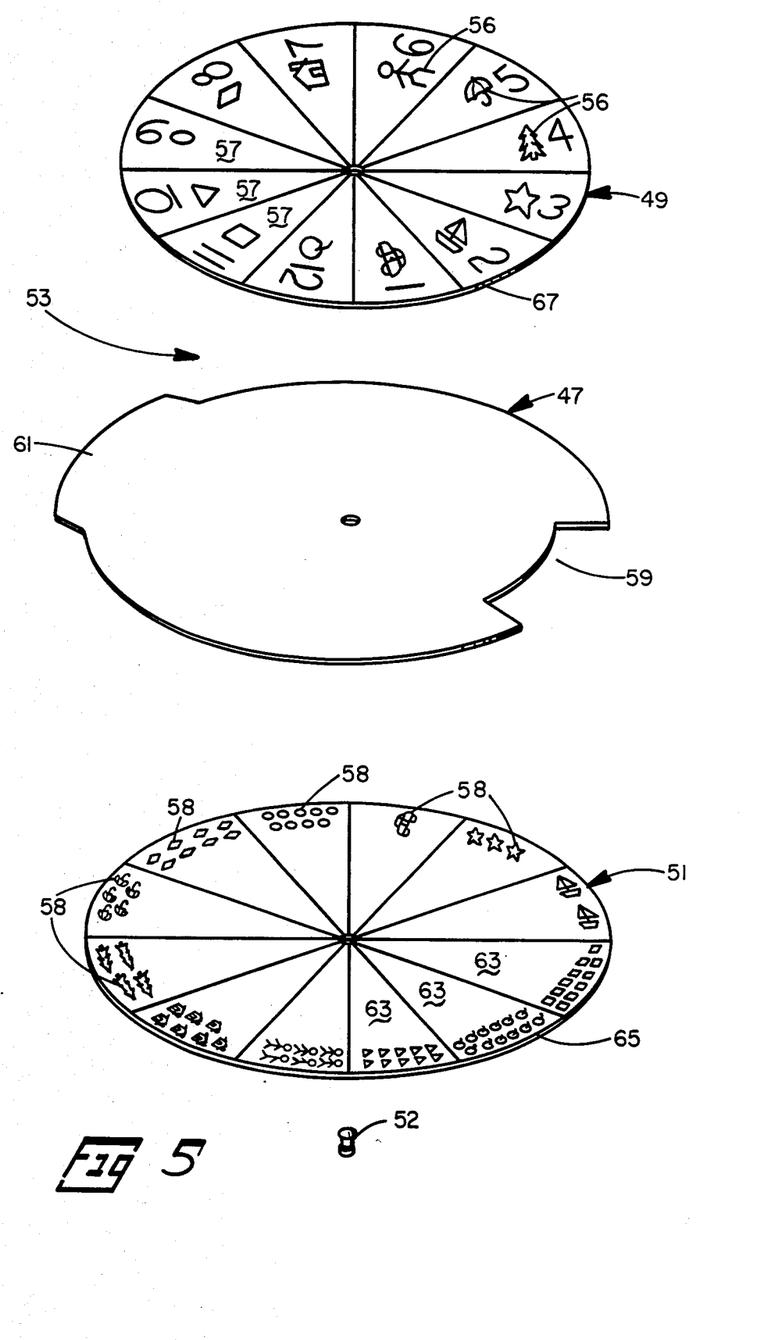
FIG. 5 is an exploded perspective view of the teaching wheel of FIG. 4.

Referring to FIGS. 4 and 5, a modified embodiment of the present invention is illustrated. In FIGS. 4 and 5, reference numeral 47 refers to a frame generally similar to the frame 3 of FIGS. 1 and 2, as described previously. Reference numerals 49 and 51 refer to a modified problem disk and answer disk, respectively. The frame 47, disks 49 and 51, and rivet 52 are assembled to create a counting wheel 53 version of a teaching wheel that is especially beneficial for teaching number and geometric shapes concepts to very young children. The problem disk bears a number of problems 55 that consist of a numeral and a symbol 56. Each problem 55 is contained in a sector 57 similar to the sectors 29 described previously with respect to the problem disk 5. The frame 47 is notched at 59 and has a handle 61 as previously described with respect to frame 3. The answer disk 49 has sectors 63 corresponding to sectors 57 of the problem disk 5. Near the periphery 65 of each sector 63 of the answer disk is a quantity of symbols 58 corresponding with one of the numerals and symbols composing the problems in the problem disk sectors 57. Because the counting wheel 53 is usually used by very young children whose fine motor coordination may not be fully developed, the radii of the frame, problem disk, and answer disk are somewhat larger than the corresponding components of the number wheel.

To use the counting wheel 53 of the present invention, the child holds the handle 61 of the frame 47 in one hand. She selects the particular numeral forming a problem 55 to be solved. She then rotates the problem disk 49 with her second hand until the sector 57 bearing the chosen problem is aligned with the notch 59 in the frame. As an exercise in counting, she must attempt to visualize and mentally count the quantity of objects equal to the problem numeral. Finally, she twirls the answer disk 51 with her second hand until the correct symbol 58 to the selected problem appears adjacent the problem in the notch. The symbols 56, 58 on the problem and answer disk, respectively, match if the chosen answer is correct. With the correlating symbols associated with the problem and correct answer, the child is motivated to point to and count the quantity of symbols. That is especially true for the larger numerals, such as 10 or 12. The counting exercise serves as an excellent drill for learning the relationship between a numeral and the corresponding quantity.

It will be understood that the options described previously with respect to the teaching wheel 1 may also be used with the counting wheel 53. In particular, a rotating hole, similar to hole 35 in problem disk 5 (FIG. 2) may be incorporated into the problem disk 49. Scallops similar to scallops 37 in problem disk 5 (FIG. 1) may be cut into the periphery 67 of the problem disk 49. To make an especially colorful and attractive counting wheel, and also to assist very young children to find the proper answer on the answer disk 49, the answer symbols 58 may be color coded to the respective numerals and symbols 56 on the problem disk. A cover similar to cover 39 (FIG. 3), previously described, may be used if it is desired that the child see only one problem at a time.

Figure 6:
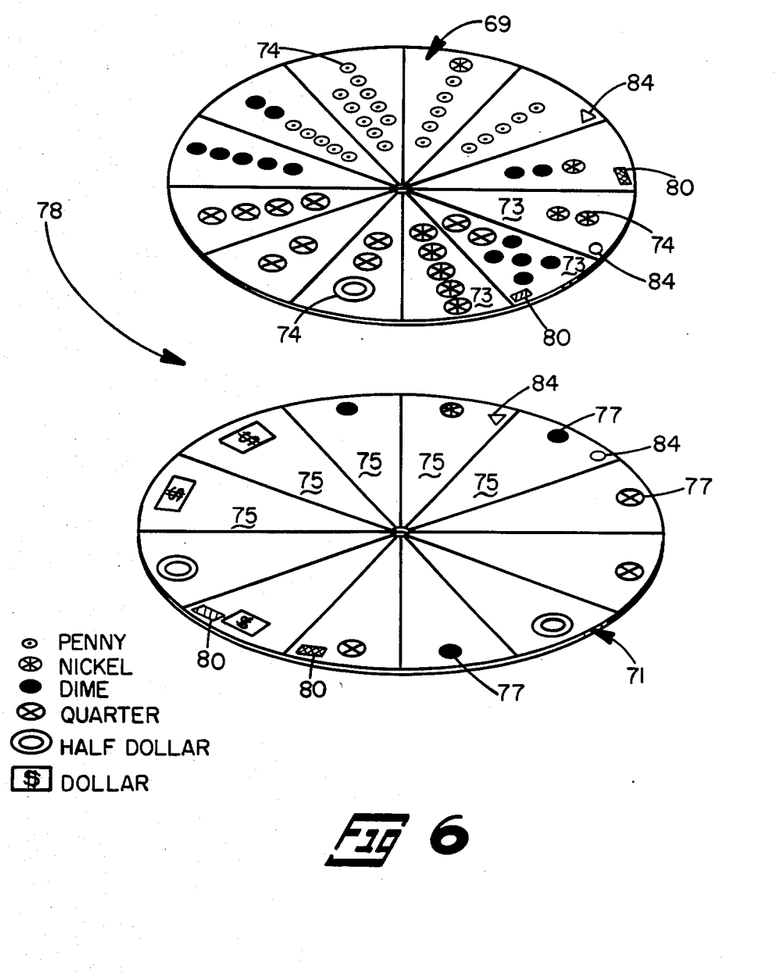
FIG. 6 is an exploded perspective view of the problem disk and answer disk of a further modified embodiment of the present invention.

Referring to FIG. 6, the problem disk 69 and answer disk 71 of a further modified embodiment of the present invention are illustrated. In FIG. 6, the educational concept to be taught to the student is the relationship between the various money denominations. The sectors 73 of the problem disk 79 contain two or more coins 74 that represent the problem to be solved by finding an equivalent denomination 77 in the sectors 75 of the answer disk 71. The problem disk and answer disk of FIG. 6 combine with a frame and rivet, not shown, to create a money wheel 78 that functions in essence like the counting wheel 53 previously described. Because the same denomination 77 appears more than one time on the answer disk of FIG. 6, coding the problems and answers is especially important with the money wheel 78. Coding may be in the form of corresponding bands of color as depicted typically at 80 or small geometric or other symbols depicted typically at 84.

Figure 7:
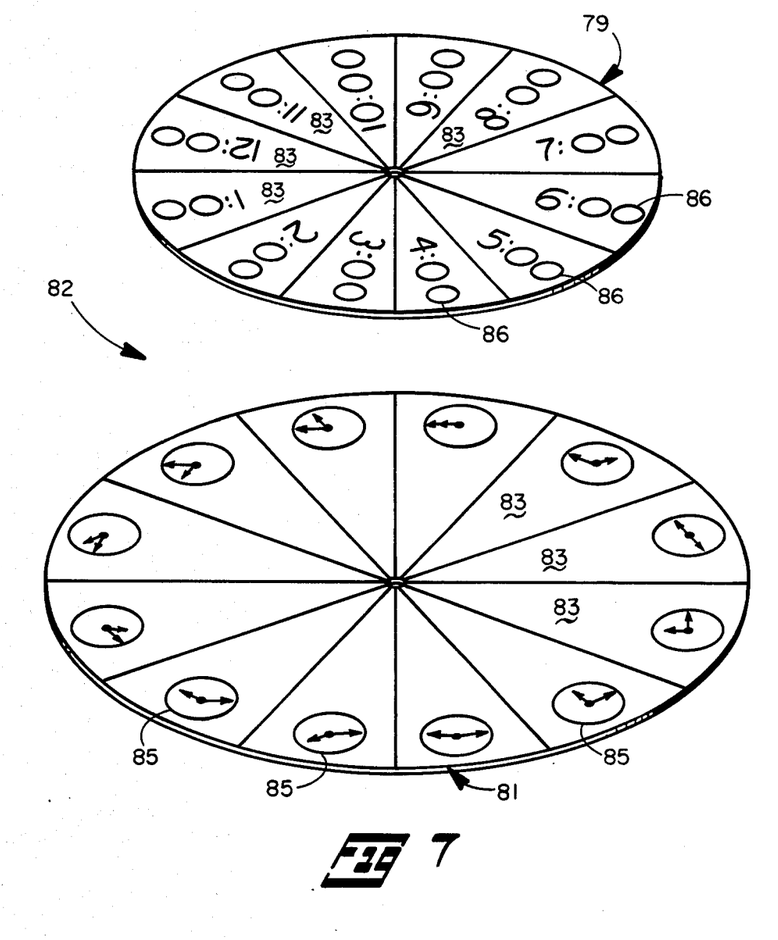
FIG. 7 is an exploded perspective view of the problem disk and answer disk of another modified embodiment of the present invention.

In FIG. 7, a problem disk 79 and an answer disk 81 are illustrated that are useful for combining with a frame and rivet, not shown, to create a time wheel 82 for teaching the concepts of time. The problem disk 79 is divided into sectors 83 containing digital representations 86 of the hours. In the answer disk 81, the sectors 83 bear answer indicia in the form of clock faces 85 having the hands thereof positioned to the hours, thus displaying analog versions of the hours. It will be appreciated that the digital and analog displays of the problem disk and answer disk may be reversed. The previously described frame and options such as coding, cover, and problem disk turning aids are also applicable to the time wheel 82.

The concept of the teaching wheel of the present invention is eminently suitable for incorporating other concepts to assist students master important commonly experienced relationships. Such relationships include musical scales or notes in conjunction with piano or other instrument keys, and phonetic sounds in conjunction with letters of the alphabet. The teaching wheels of the present invention are also very versatile as to size. Large versions suitable for classroom demonstrations are contemplated, as are miniature pocket sized versions suitable for use by a child riding in an automobile.

Figure 8:
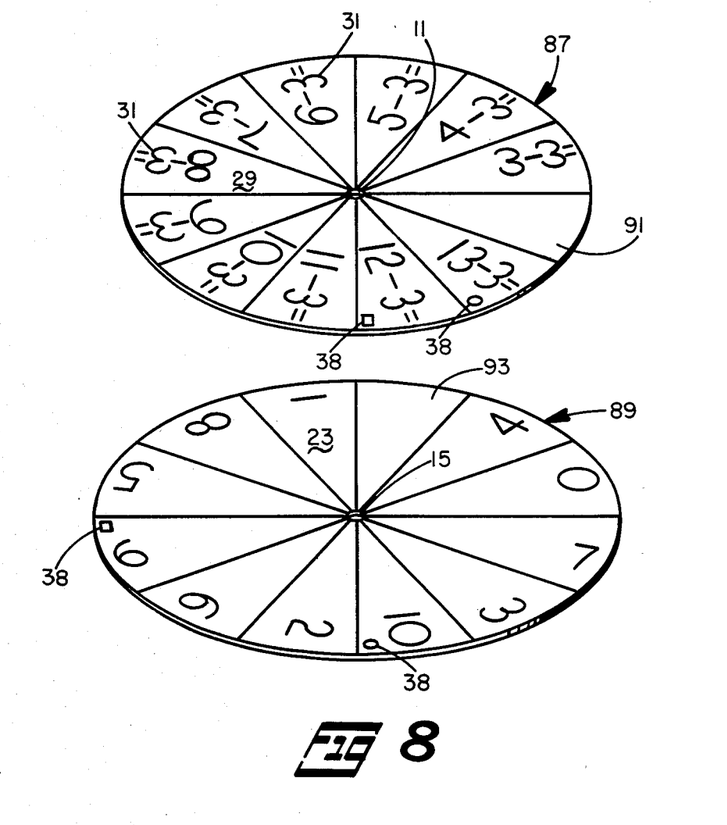
FIG. 8 is an exploded perspective view of the problem disk and answer disk of an additional modified embodiment of the present invention.

Because children must frequently be encouraged to practice learning the various concepts and relationships, the addition of variety to the teaching wheels in the form of surprise elements is very beneficial. For that purpose, any of the previously described teaching wheels can be modified so that one or more sectors on the problem disk and answer disk are left blank. Referring to FIG. 8, an exemplary modified problem disk 87 and answer disk 89 are shown that are similar to problem disk 5 and answer disk 7 in all respects except that one sector 91 in the problem disk is devoid of problem indicia and one sector 93 in the answer disk is devoid of answer indicia. I have found that a short and simple message from the teacher or parent written on the blank sectors 91 and 93 greatly interest and motivate children. For example, the problem disk sector 91 may contain "Today you did", and the answer disk sector 93 may contain "well". If the disk material is easily erasable, the message can be changed frequently. Such interest on the part of the parent or teacher is greatly appreciated by the child.

Thus, it is apparent that there has been provided, in accordance with the invention, a teaching wheel that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:
1. A teaching wheel comprising:
 a. a frame fabricated from a thin material and having a center and periphery, the frame defining a notch extending from the periphery toward the center;
 b. a problem disk superimposed on the frame and having a center coaxial with the frame center, the problem disk having a periphery terminating inwardly of the frame periphery and bearing a plurality of problem indicia thereon;
 c. an answer disk underlying the frame and having a center coaxial with the problem disk center, the answer disk having a periphery approximately coextensive with the frame periphery, the answer disk bearing answer indicia corresponding to each of the problem indicia on the problem disk, the answer indicia being located on the answer disk at locations adjacent the periphery thereof and outwardly of the problem disk periphery; and
 d. rivet means for mounting the problem disk and answer disk for rotation about the respective centers thereof to the frame center,
  so that the problem disk may be rotated relative to the frame to align a selected problem indicia with the frame notch and the answer disk may be rotated relative to the frame to display a selected answer indicia in the frame notch adjacent the selected problem indicia.

2. The teaching wheel of claim 1 wherein:
 a. the problem disk defines a plurality of sectors and the problem indicia are arranged radially from the problem disk center toward the problem disk periphery within the respective sectors;
 b. the answer disk defines a plurality of sectors corresponding to the sectors of the problem disk and the answer indicia are arranged radially from the answer disk center within the respective answer disk sectors; and
 c. the frame notch is bounded by a pair of radial edges corresponding with the radial edges of the problem disk and answer disk sectors and a third edge that underlies the problem disk.

3. The teaching wheel of claim 2 wherein:
 a. the frame has a generally circular periphery at a first radius from the frame center;
 b. the problem disk has a generally circular periphery at a second radius from the problem disk center, the second radius being less than the first radius; and
 c. the answer disk has a generally circular periphery having a radius at least as great as the second radius from the answer disk center.

4. The teaching wheel of claim 1 wherein the problem disk defines a hole therethrough for accepting an object to aid in rotating the problem disk.

5. The teaching wheel of claim 1 wherein the periphery of the problem disk defines a plurality of scallops for aiding in rotating the problem disk.

6. The teaching wheel of claim 2 wherein:
 a. the problem indicia comprises arithmetic problems to be solved; and
 b. the answer indicia comprises a numeral in each answer disk sector representing the correct answer to one of the arithmetic problems of the problem disk.

7. The teaching wheel of claim 6 wherein:
 a. the arithmetic problem indicia comprises a partial arithmetic equation in each problem disk sector, each partial arithmetic equation being arranged radially in a row to constitute an accurately expressed partial arithmetic equation in horizontal form; and b. the answer indicia on the answer disk are arranged radially in rows, so that when the problem disk is rotated to align a selected problem indicia with the frame notch and the answer disk is rotated to align the correct answer indicia with the frame notch the problem and answer indicia accurately express an arithmetic equation.

8. The teaching wheel of claim 7 wherein the problem indicia in each problem disk sector and the respective answer indicia in each answer disk sector bear correlating code indicia that contrasts with the coding indicia of the problem indicia and corresponding answer indicia of the remaining sectors.

9. The teaching wheel of claim 8 wherein the code indicia on the problem and answer disks comprise the problem and corresponding answer indicia being color coded in contrasting colors with respect to the problem indicia and corresponding answer indicia of the remaining sectors.

10. The teaching wheel of claim 8 wherein the code indicia on the problem and answer disks comprise geometric shape indicia imprinted on each of the problem disk sectors and corresponding answer disk sectors.

11. The teaching wheel of claim 2 further comprising a cover attached to the frame and overlying the problem disk, the cover having a center coaxial with the frame center and a periphery, the cover periphery defining a cutout generally aligned with the frame notch, the cover cutout extending from the cover periphery to a location close to the cover center, so that the problem indicia of the problem disk are partially covered by the cover.

12. The teaching wheel of claim 11 wherein the cover periphery is generally coextensive with the frame periphery, and wherein the cover cutout is defined by two radial edges aligned with the radial edges defining the frame notch, so that the cutout has the general shape of the problem disk sectors and only one problem indicia on the problem disk is viewable at a time through the cover cutout sector.

13. The teaching wheel of claim 2 wherein the problem indicia in each sector of the problem disk comprises a numeral and a symbol, and wherein the answer indicia comprises a quantity of symbols in each answer disk sector corresponding with the numeral and symbol indicia on one of the problem disk sectors.

14. The teaching wheel of claim 13 wherein the problem indicia in each sector of the problem disk and the respective answer indicia on each answer disk sector are color coded in contrasting colors with respect to the problem indicia and answer indicia of the remaining sectors.

15. The teaching wheel of claim 2 wherein the problem indicia in each sector of the problem disk comprises a set of numerals representing selected times displayed in digital form, and wherein the answer indicia on the answer disk comprises representations of a clock in each answer disk sector indicating in analog form the time equivalent to the respective time displayed on one of the problem disk sectors.

16. The teaching wheel of claim 2 wherein the problem indicia in each sector of the problem disk comprises a set of coins, and wherein the answer indicia comprises representations of a monetary denomination in each answer disk sector equivalent to the respective sets of coins displayed on one of the problem disk sectors.

17. The teaching wheel of claim 16 wherein the problem indicia of each problem disk sector and the respective answer indicia of each answer disk sector bear correlating code indicia that contrasts with the code indicia of the problem indicia and corresponding answer indicia of the remaining sectors.

18. The teaching wheel of claim 2 wherein at least one problem disk sector and at least one answer desk sector are devoid of problem and answer indicia, respectively, so that variable indicia may be imprinted on and removed from the blank problem disk and answer disk sectors to add variety to the problem and answer indicia on the remaining respective sectors.

19. The teaching wheel of claim 3 wherein the periphery of the answer disk defines a plurality of scallops for aiding in rotating the answer disk.

* * * * *